(No Model.) 2 Sheets—Sheet 1.
C. E. SCRIBNER.
NEEDLE PLUG TEST SYSTEM FOR MULTIPLE SWITCHBOARDS.
No. 572,218. Patented Dec. 1, 1896.
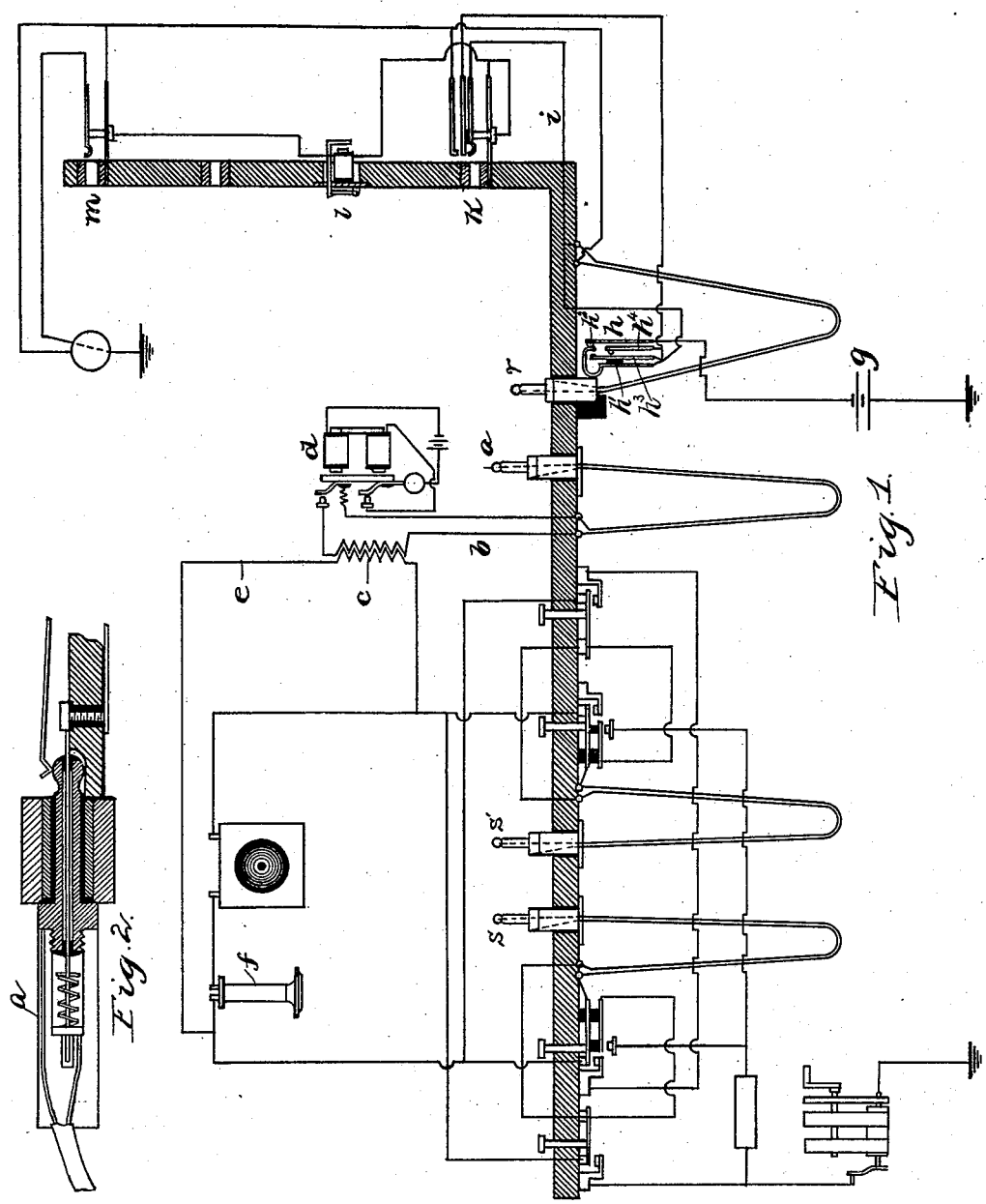
Witnesses.
George L. Cragg
M. Jane Pallett.
Inventor:
Charles E. Scribner.
By George H. Barton
Att'y

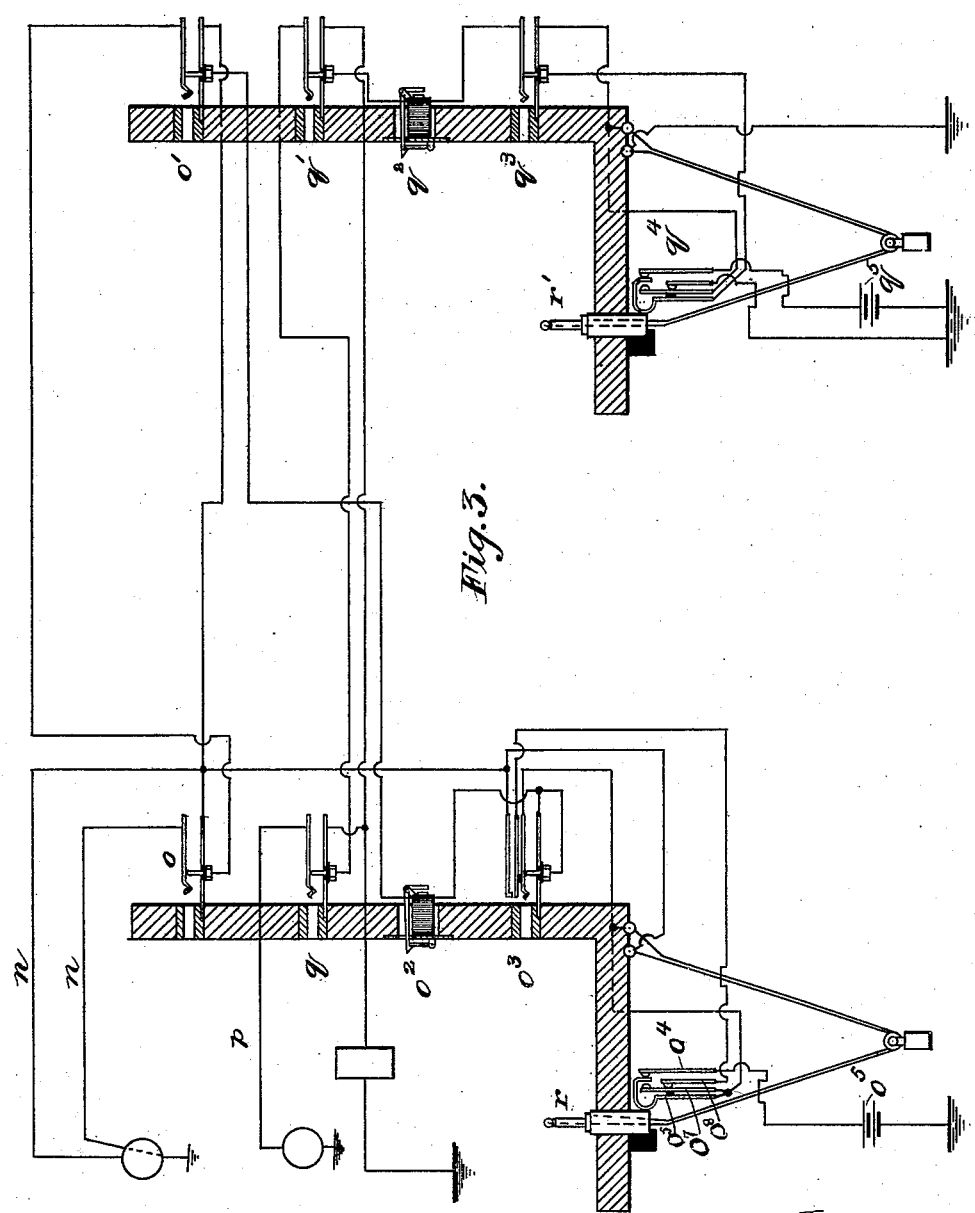

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

NEEDLE-PLUG TEST SYSTEM FOR MULTIPLE SWITCHBOARDS.

SPECIFICATION forming part of Letters Patent No. 572,218, dated December 1, 1896.

Application filed June 1, 1888. Renewed February 24, 1890. Serial No. 341,403. (No model.)

*To all whom it may concern:*

Be it known that I, CHARLES E. SCRIBNER, a citizen of the United States, residing at Chicago, in the county of Cook and State of Illinois, have invented a certain new and useful Improvement in a Needle-Plug Test System for Multiple Switchboards, (Case No. 157,) of which the following is a full, clear, concise, and exact description, reference being had to the accompanying drawings, forming a part of this specification.

My invention relates to a multiple-switchboard system of a telephone-exchange; and its object is to provide a reliable and rapid test whereby it may be determined at one board whether a line called for is in use or not.

My invention consists, first, in providing in connection with a multiple-telephone-exchange-switchboard system a battery normally connected with the lines after passing through the switchboards and a switching device for looping a telephone into the circuit at either of the boards to determine whether the said battery is or is not connected with the line, and, second, in providing a battery connection at the central office with each line, and in testing apparatus so arranged that when a line tested is not in use current will be sent from the battery of the line tested through the rheotome and one winding of an induction-coil, the other winding of the induction-coil including the operator's telephone. Thus, when the test is made, if the line is free the tone or buzz caused by the vibration of the rheotome in the battery-circuit, or the click caused by bringing the telephone into the battery-circuit in case the rheotome is omitted, will be heard in the telephone. When, however, a connection is made with any line, or if the terminal plug of any line is lifted from its grounding-jack, its battery connection will be open, and hence when a line in use is tested no sound will be heard in the telephone.

In Figure 1 I have shown a section of a multiple switchboard and keyboard table in connection with my testing apparatus. I have represented the substation, with which the telephone-line is connected, by a circle, one side of the line being supposed to be connected through the bell at the substation, as indicated by the dotted line, with ground at the substation in a manner well known and in common practice. Fig. 2 is a detailed sectional view of the needle test-plug inserted in a spring-jack switch. Fig. 3 is a diagram illustrative of the circuits of two telephone-lines connected with two boards of a multiple-switchboard system, one of said lines being metallic and the other single, both lines, however, being provided with terminal plugs according to the single-cord system.

Like parts are indicated by similar letters of reference in the different figures.

Referring to Fig. 1, it will be seen that the needle test-plug $a$ (for detail see Fig. 2) consists of a metallic sleeve or shank provided with the usual tip or ball and a central needle. The needle passes axially through the center of the shank and is insulated therefrom. A coiled spring presses the needle outward. When the plug is inserted in a spring-jack, the needle is forced back, the spring being compressed sufficiently to permit of the plug being completely inserted, so that the ball or tip may lift the switch-lever from its normal contact-point, as shown in Fig. 2. The needle thus forms a yielding connection, insuring always a good contact between the needle and the contact-point of the switch in which the plug may be inserted. The circuit $b$ between the needle and the shank of the plug, as shown in Fig. 1, is connected through one of the wires of an induction-coil $c$ and the main contacts of a rheotome $d$ or other appliance for interrupting the circuit. The circuit-breaker $d$ is constantly and automatically operating, owing to the battery in its own local circuit, to break the circuit of the cord connecting the sleeve and the tip of the test-plug. The other winding of the induction-coil is included in wire $e$, connected with different sides of the operator's telephone $f$. The telephone-line circuit $n\ n$, whether metallic or grounded, is continued from the contact-pieces of the last spring-jack to the different contact-pieces of an ordinary terminal loop-plug $r$. Plug $r$ rests in a socket provided with springs, which constitute the device generally known as a "grounding-jack." This particular grounding-jack $h$ comprises a spring $h'$, adapted to bear upon one side of the terminal plug, and when the latter is in its socket to be forced against a contact $h^2$ and away from a spring $h^3$. When the terminal plug is removed from its socket, the spring $h'$ closes the spring $h^3$ with such force as to separate the latter from the contact $h^4$, against which it normally bears. A battery $g$, one pole of which is grounded, is shown connected to the contact $h^2$, whence as long as the plug is in its socket it finds circuit to the spring $h'$, and thence by wire $i$ through the lever and contact of answering-jack $k$, and thence through the annunciator $l$ to spring-jack $m$. Spring-jack $m$ may be considered as one of several spring-jacks of the line distributed on different boards. This will be understood by reference to Fig. 3, in which two telephone-lines are shown, the metallic circuit $n$ being connected through a switch $o$ of the first board and thence through a switch $o'$ of the second board and thence back through the annunciator $o^2$ and answering spring-jack $o^3$ and through the grounding-jack $o^4$ and the battery $o^5$ to ground. The single telephone-line $p$ is shown connected through its spring-jack switches $q$ $q'$ of the different boards through annunciator $q^2$, answering spring-jack $q^3$, and grounding-jack $q^4$ and battery $q^5$ to ground. In this manner each telephone-line is normally connected with a battery or other source of electricity.

As shown in Fig. 3, the terminal plugs $r$ $r'$ of the different lines are shown inserted in their sockets. In this position the grounding-jacks are brought in position to close the battery to line, as above described. On lifting the terminal plug of any line the grounding-jack of the line is changed so as to disconnect said line from battery at the grounding-jack. Moreover, whenever a connection is made with any spring-jack of a line the battery of that line will be cut off at the spring-jack where the connection is made. This description has reference especially to the single-cord system. The same result may be accomplished in various ways in double-cord systems; that is to say, the circuits may be arranged so that the normal battery connection with any line will be opened whenever said line is in use.

In Fig. 1 I have shown a pair of loop-plugs $s$ $s$ connected in such manner that when on inserting either plug in the spring-jack of a line the operator's telephone will be looped into the circuit of the line. The circuits and connections specially shown between these plugs and the operator's outfit do not form any part of my invention and are therefore disclaimed.

I have not deemed it necessary to show the needle-plug and its connections in Fig. 3. It is to be understood that each operator will be provided with a needle-plug connected with her telephone outfit, as described with respect to needle test-plug $a$ of Fig. 1.

In order to make a test, the operator inserts the needle-plug into the spring-jack upon her board of the line called for in the manner shown in Fig. 2. If the line is not in use, the circuit of the battery normally connected with said line will be completed through the induction-coil and rheotome to the needle test-plug thus inserted, and the operator listening at her telephone included in the circuit of the other winding of the induction-coil will hear the hum of the rheotome. This testing-circuit may be traced from ground through battery $g$ to contact $h^2$, thence through spring $h'$, wire $i$, the contacts of the answering-jack $k$, the annunciator $l$ to the back contact of the first spring-jack $m$, thence—supposing this jack to be the one at which the test is being made—to the needle of the testing-plug, thence through the local circuit, including the rheotome and one winding of the induction-coil $c$, and to the sleeve of the testing-plug $a$, thence to the line-spring of jack $m$ and over the corresponding side of the line-circuit to earth at the substation. If, however, the line tested is busy or if its terminal plug has been lifted, its normal battery connection will be opened, and hence no sound will be heard by the operator on inserting her needle test-plug in the spring-jack of the line.

I prefer to use the rheotome in connection with the battery-circuit in order that the signal or sound caused in the telephone may be of a distinct and positive character. It is evident, however, that my system would be operative without the rheotome, since the closing of the circuit through the telephone would cause a click or sound which would satisfactorily answer the purpose of indicating to the operator the presence of the battery.

Having thus described my invention, I claim as new and desire to secure by Letters Patent—

1. The combination with a telephone-line connected to ground at the substation and with switches on two or more switchboards and through a grounding-jack and battery to ground, of a test-plug inserted in a spring-jack of the line, said test-plug being provided with two contacts or terminals, one of said terminals being connected with the lifted spring of the spring-jack and the other terminal being connected with the contact-point of the spring-jack, a circuit between said terminals including one winding of an induction-coil and a rheotome or vibrator and a telephone included in the circuit of the other winding of the induction-coil, whereby on listening at the telephone, a tone or vibration may be heard, substantially as described.

2. The combination with a telephone-line connected to earth at a substation and with spring-jack switches, one on each of two or more multiple switchboards, and from the switch on the last board through a grounding-jack and battery to ground, of the terminal plug of said line inserted in said grounding-jack to close the connection of the line with said battery, a switching device including one winding of an induction-coil and the main contacts of a rheotome or vibrator, which switching device on being inserted in a spring-jack of the line loops said winding of the induction-coil and rheotome into the circuit and a telephone connected in a circuit with the other winding of the induction-coil, substantially as described.

3. The combination with the needle test-plug provided with an insulated contact-piece and a needle-point, and said contact-piece and point constituting the terminals of a rheotome and one winding of an induction-coil included in circuit between said terminals, a telephone included in circuit with the other winding of the induction-coil, a telephone-line including two or more switches and a test-battery, whereby on inserting the test-plug in one of the spring-jack switches of the line it may be determined whether or not said line is open at another spring-jack of the line.

4. In a test system for telephone-switchboards, a normally-closed circuit including a source of current for each line, means for making connection with the line at any of several points and simultaneously interrupting the said circuit there, a test-indicating instrument, and a testing-plug connected therewith adapted to break the said circuit and loop the said instrument into the circuit, whereby the test instrument is caused to respond when the line is free, substantially as described.

5. The combination with a telephone-line extending to the central station and connected through spring-jacks upon the several switchboards, of a source of electricity normally in circuit with the line, but adapted to be disconnected therefrom when connection is made with the line, a loop-plug adapted to be inserted into a spring-jack of the line, and a signaling device connected between the terminals of the loop-plug adapted to respond when said source of electricity is connected in circuit but to remain irresponsive when said source of electricity is disconnected from the line, substantially as described.

6. The combination with a telephone-line grounded at each terminal, of spring-jack switches included serially in the line said spring-jack switches having separable contacts, and a source of testing-current normally connected with the said telephone-line but adapted to be disconnected therefrom when the line is switched for conversation, a plug adapted for insertion into a spring-jack switch having contact-pieces adapted to register with the separated contact-points of the spring-jack, respectively, and a signaling instrument in a circuit between the contact-pieces of the plug, substantially as described.

7. The combination with a telephone-line, of spring-jack switches having separable contacts included serially in the line-circuit, a ground connection with the line before the first spring-jack, and another ground connection including a source of testing-current after the last spring-jack in the series, a loop-plug adapted for insertion into any spring-jack to register with the separated contacts of the spring-jack, and a signaling instrument included in a circuit between the contact-pieces of the plug, substantially as described.

In witness whereof I hereunto subscribe my name this 12th day of March, A. D. 1888.

CHARLES E. SCRIBNER.

Witnesses:
CHAS. G. HAWLEY,
CHAS. C. WOODWORTH.